United States Patent Office 3,320,110
Patented May 16, 1967

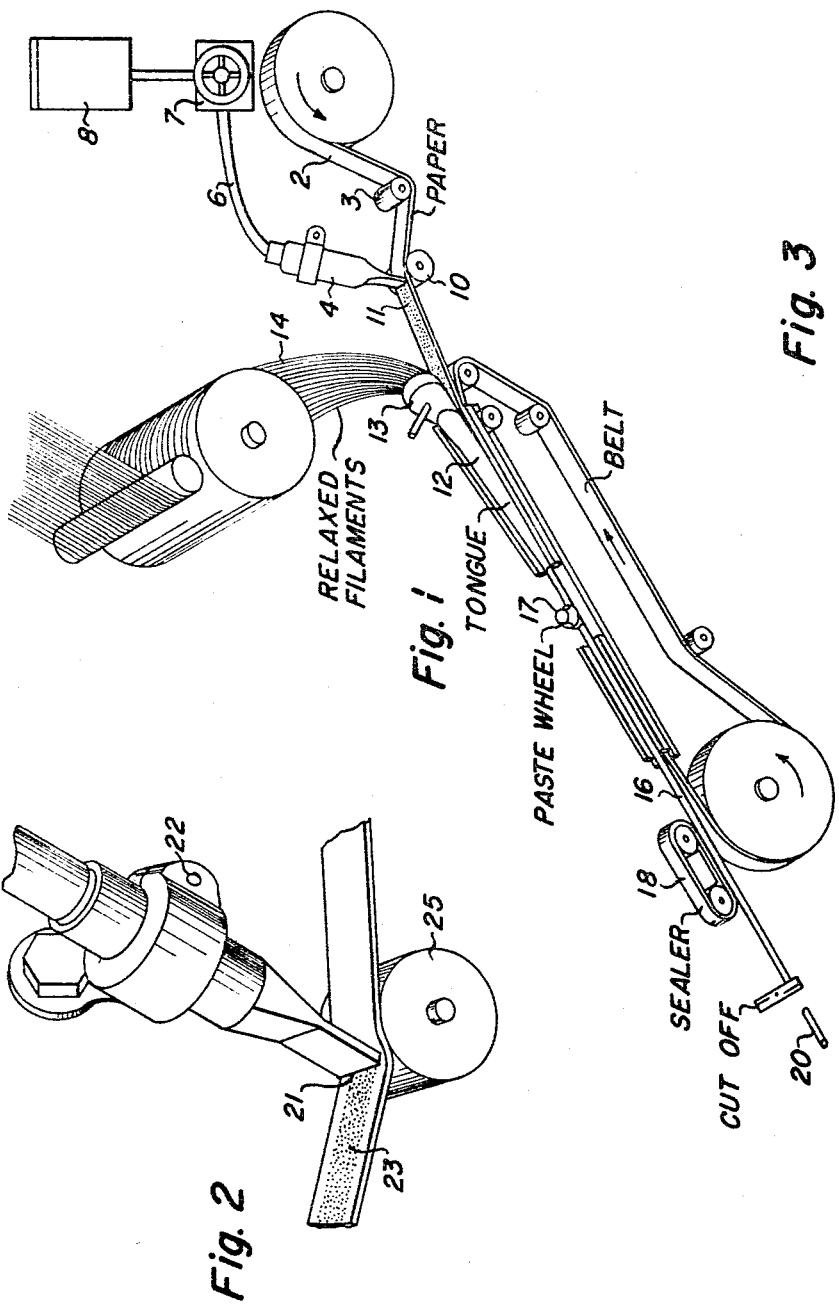

3,320,110
APPARATUS FOR MAKING FILAMENT
TOBACCO SMOKE FILTERS
Paul Gallagher, Kingsport, Tenn., assignor to Eastman Kodak Company, Rochester, N.Y., a corporation of New Jersey
Continuation of application Ser. No. 135,245, Aug. 31, 1961. This application Aug. 1, 1966, Ser. No. 570,133
5 Claims. (Cl. 156—438)

This application is a continuation of my copending application Ser. No. 856,769, filed Dec. 2, 1959, and now U.S. Patent No. 3,205,107.

This invention relates to apparatus for the manufacture of filament tobacco smoke filters. More particularly this invention relates to apparatus for the manufacture of cellulose acetate paper-wrapped filters which filters are improved in that the filaments of the filter are bonded to the wrapping material enclosing the periphery of the filter.

The manufacture of cellulose acetate tobacco smoke filters in accordance with the disclosure contained in my co-workers' U.S. Patent No. 2,794,480 has been favorably received in the industry and good filters may be produced by the disclosure of said patent. However, in some instances, such as the making of filters from filament material of low denier and/or low crimp, there may be a tendency of the filament part of the filter not to be as firmly positioned against the wrapper enclosing the filter as is desirable. This can permit the channeling or by-passing of the smoke between the filaments and the wrapper, thereby reducing the efficiency of the filter. In a co-pending U.S. patent application of another of my co-workers, Ser. No. 824,577, now U.S. Patent 3,025,861, the aforementioned problem concerning the separation of the filaments from the wrapper is discussed in detail, and my co-worker has described procedure for overcoming this difficulty. It is apparent that in the manufacture of filters of the type indicated that it is important to be able to operate at high rates of production. Accordingly, the development of certain improvements in the apparatus for making filters as described in my co-workers' patent and application referred to above represents a desirable result.

After extended investigation, I have found an apparatus whereby improved filament filters may be produced at relatively high speeds of production to give filter elements generally in accordance with the product of said application 824,577, which filter products are characterized in that the filaments and the inside of the wrapper are not subject to separation or the like. In addition, such filters may possess other advantages, for example, such as having greater firmness.

This invention has for one object to provide apparatus for use to improve the efficiency of tobacco smoke filters made from crimped continuous filaments by eliminating the possibility that smoke may pass between the periphery of the filter and the wrapper. Another object is to provide apparatus for the manufacture of filters resistant to shrinking in cross section due to the action of the hot, moist smoke. A further object is to provide a simple, inexpensive apparatus for obtaining adhesion between the wrapper and the periphery filaments of the filter bundle. Another object is to provide means readily adaptable to existing filter forming equipment and suited to high speed operation. Still another object is to furnish apparatus for securing a uniform square cut when subdividing filters into short lengths, said cut being essentially free of any fuzziness caused by displacement of the fibers adjacent to the inner surface of the wrap.

In the broader aspects, my invention involves apparatus for coating a plug (filament-filter) wrap paper or other wrapper with a coating composition by means of which the outer layer of filaments in the filter elements are made to adhere to the wrapping material. By thus fixing the position of the filaments at the periphery of the filter, the shrinkage associated with smoking, particularly with fine denier per filament tows, is eliminated. As a result, substantially all of the smoke must pass through the filter between the filaments, and the tar removal is increased and more consistent.

Any one of several general types of adhesives may be applied using the apparatus of this invention: (1) a molten thermoplastic material, (2) a compound which is sensitive to the solvent action of a plasticizer component thereof, and (3) a water-soluble adhesive. Thermoplastic adhesives which may be used include polyethylene, polypropylene, polyvinyl acetate, copolymers of various acrylates and methacrylates, ethyl cellulose derivatives, various resins of the terpene family, and other thermoplastic materials known to those skilled in the art. If a plasticizer-sensitive coating composition is used a preferable composition is a cellulose ester-triacetin liquid dope which composition preferably contains 1–4% cellulose acetate, balance triacetin. However, higher percentages of cellulose acetate may be used. When the plasticizer-sensitive composition contains less than 10% cellulose ester, conventional paste wheel and sealer are ordinarily used, one edge of the wrapper being left uncoated for a sealer composition to be added by the paste wheel to the overlapping seal portion. In the case of a cellulose ester-triacetin coating composition, the composition is not an adhesive at the time of application from the applicator, but, on the other hand, when it contacts the filaments during the wrapping operation, it quite readily bonds the filaments to the paper, apparently by absorption of the triacetin. In place of triacetin (glycerol triacetate) any of the following compounds may be used in the pasticizer-sensitive compounds: glycerol tripropionate, di(methoxyethyl) phthalate, triethyl citrate and methyl phthalyl ethyl glycolate. The solid component which must be soluble in the plasticizer may be cellulose acetate propionate, polyvinyl acetate, certain natural gums or the like. When the paper is coated with a water-soluble adhesive, the adhesive may be activated by the application of water by a sponge or wicking device just before the paper enters the garniture. The water-sensitive adhesive may be an animal glue adhesive or a starch paste adhesive, or the like.

In accordance with one embodiment of the present invention, the coating composition was applied through a ¾" O.D. tube terminating in a flared slot $15/16''$ x $1/32''$. The paper passed under and was in contact with the slot. This spreader tube was connected to a dope supply tank which was approximately 2 feet above the surface of the slot in the spreader. The flow of dope of coating composition or the weight of dope deposited on the paper was controlled by the dimensions of the slot, the viscosity of the dope, the height of the supply tank and the pressure of the paper against the slot. When the coating composition is highly viscous, for instance contains more than 10% cellulose acetate if a plasticizer-sensitive composition is used or when the coating composition is a thermoplastic compound such as molten polyethylene, a roller applicator may be used to replace the slot applicator to be described in detail hereinafter. Using the above described equipment and method, it was found that 1 g. to 1.5 g. of dope per 180 cm. length of paper [equivalent to 23 g. to 34.5 g./m.$^2$ (grams per square meter) of coated area] could be applied evenly and gave good adhesion between the filter and the paper wrap. The coating composition may be applied over the full width of the paper, on only a narrow center portion which is to be diametrically opposite the seal after preparation of the filter, or over substantially the entire width of the paper with the exception of a small area on one edge, depending upon the degree of adherence of the paper to the filaments desired and whether it is desired to subsequently add a sealing glue on the overlapping seam portion.

In further detail, the over-all apparatus for making filters in accordance with the present invention may be along the lines disclosed in the aforementioned U.S. Patent 2,794,480. That is, apparatus arrangement for moving from the package the filaments which are to be made into the filter, the opening and banding of these filaments, the spraying of these filaments and the like may be in accordance with the disclosure of FIG. 1 of said Patent 2,794,480. However, referring to FIG. 5 of said patent, in order to practice the present invention, the apparatus for processing of the paper wrap and certain other items would be changed to embody the present invention.

Or, rather than proceeding with the arrangement disclosed in FIG. 5 just mentioned, the filter forming and wrapping means described in copending U.S. patent application Ser. No. 761,602, now U.S. Patent 3,016,945, of my co-worker Wexler may be employed.

For assistance in the better understanding of the instant invention, reference is made to the attached drawing forming a part of the present application. In the attached drawing:

FIG. 1 is a semidiagrammatic side elevation view of one apparatus arrangement which would be used for carrying out the present invention;

FIG. 2 is a detail view on an enlarged scale of a portion of the apparatus shown in FIG. 1; and FIG. 3 is a detail top view of one form of coating applicator for applying the coating of the instant invention.

Referring to FIG. 1, which concerns a segment of an apparatus used for the line production of filters, it will be kept in mind that the filaments 14 shown in FIG. 1 have gone through other steps of the process (not shown) so that the filaments are at the stage of the process where they are to be wrapped. In further detail, the filaments which are being made into a filter have proceeded through the first steps of the aforementioned Patent 2,794,480 such as indicated in FIGS. 1, 2 and 3 of said Patent 2,794,480 and have now arrived at the wrapping stage indicated in FIG. 5 of said Patent 2,794,480.

Or, the filaments may have been processed according to apparatus described in said Wexler application Ser. No. 761,602, now U.S. Patent 3,016,945, and be at the wrapping stage shown in this application.

Therefore, referring to FIG. 1, a source of paper wrap material is provided at 2, such wrapping material being continuously supplied from a roll. This wrap material is passed under a guide roll 3 so that it may be directed in contact with the applicator 4 of the present invention after the paper wrap passes over roll 10. The wrap used in the present invention may be conventional filter wrap paper of a thickness of approximately 0.03 mm. However, in many instances where the filaments being processed are of a denier of 3 or below, I prefer to use a wrap of a greater thickness such as 0.06 mm.

The applicator 4 is positioned (as better shown in FIG. 2) to apply certain coatings in accordance with the present invention against the inside of the paper wrap after the wrap passes over roll 10. It is more or less cylindrical or of cylindrical portions with the exception of a tapered nozzle portion, which flattens out and expands somewhat as it touches the moving paper 11 substantially perpendicularly. The applicator 4 is connected by flexible conduits 6 through a valve means 7 which is connected to supply tank 8. The control of the height (head) of this supply tank above the applicator and the level therein are of some importance in obtaining the most uniform coating out of applicator 4.

Therefore, by the combination of applicator 4 with the paper passing over roll 10 there may be applied to the inside of the paper a relatively thin layer of the coating composition of the present invention. This may be accomplished at relatively high speed since the coating composition of the present invention is not adhesive or particularly tacky at the point of application thereof. As will be noted from the description hereinafter, the coating composition applied with apparatus of the present invention does produce bonding between the filaments and the paper wrap.

This coated wrap 11 is then fed into the filter forming garniture 12. This garniture 12 is provided with suitable means 13 through which the filaments may be injected into the garniture for forming into the desired filter shape.

The formed filter 16 leaving garniture 12 is wrapped in the wrapper. Pasting and sealing means designated generally at 17 and 18 may be provided for sealing the filter. Also, means may be provided for heating the sealed filter element, cutting the filter elements into certain lengths and the like. The bar portion 19 of sealer 18 may be heated in such a manner as to transfer heat to the moving band and onto the seam portion of the filter product. Since these various parts may be in accordance with the disclosure in the aforesaid Patent 2,794,480 or as disclosed in said companion application 761,602, now U.S. Patent 3,016,945, extended description thereof appears to be unnecessary. It is sufficient to indicate that the formed and wrapped filter is ejected at 20 and may be stored, packaged or otherwise handled in the conventional and desired manner.

Referring now to FIG. 2, which figure shows on a larger scale the feature of applying the coatings of the present invention, the tip of the applicator is indicated at 21, which tip slightly depresses the paper after it passes in contact with roll 25. The paper is coated on the inside as indicated at 23. The applicator is positioned in a manner so that it may be rotated as at 22 for better applying the coating and controlling the thickness of the coating as will be apparent from the description hereinafter.

Referring to FIG. 3, the simple internal construction of the applicator is disclosed. It will be noted that the upper end of the applicator 26 is of a size and shape to permit the fastening thereof to the flexible conduit 6 of FIG. 1. The applicator increases in size as at 27. At the outlet end 21, the applicator while increasing in width, tapers to a slot orifice. The width of this slot may be slightly less than the width of the paper when it is desired to leave a slight uncoated margin for sealing purposes or considerably less when it is desired to apply the coating composition only in a narrow strip or band approximately in the center of the wrap.

A further understanding of my invention will be had from the following examples which are set forth in order to illustrate preferred embodiments of my invention.

*Example 1*

In this example, an apparatus generally in accordance with the disclosure of the attached drawing was used. A coating composition comprised of 4% cellulose acetate incorporated with 96% glycerol-triacetate (triacetin), before filling container 8, was cooled to room temperature and the coating process of the present invention was carried out at room temperature.

The paper to be coated on the inside surface was fed through the process and apparatus of the present invention at a rate so as to produce approximately 1,000 90 mm. filter rods per minute. The tank containing the coating dope was positioned approximately 3 feet above the paper. The amount of dope flowing through the applicator nozzle onto the paper was controlled by the amount of pressure between the nozzle and the paper. This can be done, as may be seen from FIG. 2, by causing the paper to "break" or angle over the end of the nozzle after it goes over roll 25. If desired, the applicator nozzle 21 may be positioned in a manner so that the vertical movement thereof against the paper can be controlled by a screw adjustment or comparable means.

A relatively uniform level of coating composition was maintained in the supply tank to insure a constant feed onto the paper and thus to provide a relatively uniform coating. In general, this coating may be approximately as thin as the apparatus will deposit continuously at the speed of the paper moving under the nozzle. A coating of a thickness of the order of 0.008 inch up to 0.0012 inch is satisfactory. As will be further noted from FIG. 2, the coating need not be applied to the edge of the paper when it is desired to leave a margin for receiving sealing adhesive or glue when the paper has been positioned around the filter and the seam sealed. In this particular example the width of the nozzle used was approximately 4 mm. narrower than the 28 mm. width paper treated. The coating went onto the paper very smoothly, and there was no accumulation or clogging of the applicator nozzle or the forming garniture when the paper proceeded to garniture 12 of FIG. 1.

*Example II*

A 2.1 denier per filament, 46,000 total denier, regular cross-section, 16 crimps per inch (c.p.i.) tow was wrapped in plug wrap paper after coating on one side with a 0.0005″ coating of 85% Epolene C low melting polyethylene and 15% Piccolyte S-115L (a polyterpene resin added to improve the sealing). An apparatus substantially as pictured in the drawing of the instant invention and described above was used to apply the coating composition and to wrap the filter elements. The smoke could not by-pass in this filter.

*Example III*

A 1.8 denier per filament, 41,000 total denier, regular cross-section, 20 c.p.i. tow was wrapped in a paper of 40 pound weight entirely coated on one side of the paper with a water-soluble animal glue. Again apparatus substantially the same as that pictured and described elsewhere in the present application was used for applying the coating composition to the paper and for wrapping the filaments with the paper. The water-activated coating also formed the seam seal and, after a two hour curing time, the filaments of the filter rod were firmly attached to the paper all the way around the filter by the glue.

Several different rods were made by the present invention using relatively fine denier filaments on the one hand to coarser filaments for other rods. These filter rods were compared with comparable filter rods made without the coating procedure of the present invention. The results of these comparisons are set forth in Table I which follows:

filament sizes are up to and include, for example, 16 denier per filament. However, in general it appears that the present invention provides more advantage when used in conjunction with the finer denier filaments of the order of 3 denier per filament or lower. In connection with filters made with these finer filaments, there may be some greater tendency of shrinkage to occur and use of the apparatus of the present invention overcomes any reduction of efficiency that could be caused by such shrinkage causing the filaments to pull away from the wrapper.

The cellulose acetate used above in the case of the plasticizer-sensitive coating composition had an acetyl content within the range of 38.5-40% and an intrinsic viscosity of about 1. Approximately 1-1.5 grams of solution will satisfactorily coat 180 cm. length of the wrap. However, 2 parts of cellulose acetate of the same acetyl content but of an intrinsic viscosity of 1.5-2 dissolved in 98 parts of triacetin will give a good bond from about .5-1.0 gram of solution per 180 cm. of wrap.

Although I prefer the apparatus described above, since the applicator shown constitutes a relatively simple and inexpensive way of adapting existing filter manufacturing equipment to the present invention, in the broader aspects the present invention is not restricted exactly to the construction shown. It would be possible to replace or supplement my applicator construction with a wick or brush or to use a roll applicator. Or, in certain instances special spray gun equipment could be substituted for my simple nozzle applicator. However, certain of these additional constructions would involve increased expense and would not produce a better product. In the event added refinements are to be made in the present apparatus, I would prefer to provide screw adjustment devices whereby my nozzle applicator might be better aligned and positioned vertically with respect to the rapidly moving paper.

The invention has been described in detail with particular reference to preferred embodiments thereof, but it will be understood that variations and modifications can be effected within the spirit and scope of the invention as described hereinabove and as defined in the appended claims.

I claim:

1. In a filter-making apparatus comprising, a filter-forming garniture, means for feeding a strip of filter wrap paper into said garniture along a predetermined path, means for feeding cellulose acetate filter-forming filaments into said garniture to be enwrapped therein by said strip, and means for applying a coating to said strip before it is fed into said garniture, the improvement wherein said filter wrap paper is further characterized by having a thickness of less than 0.06 millimeter and said coating contains a plasticizer for cellulose acetate; and said coating applying means comprises an applicator having a slot for apply-

TABLE I

| Filaments (D/F/TD) | With Coating | | | | Without Coating | | | |
|---|---|---|---|---|---|---|---|---|
| | Rod Pressure (in. H$_2$O) | Tip Pressure (in. H$_2$O) | Percent Tar Removal | Percent Removal Per in. Tip Pressure | Rod Pressure (in. H$_2$O) | Tip Pressure (in. H$_2$O) | Percent Tar Removal | Percent Removal Per in. Tip Pressure |
| 1.6/32,000-1.6/37,000 | 13.2 | 2.32 | 46.8 | 20.2 | 12.2-12.9 | 2.34 | 41.3 | 17.6 |
| 3.0/78,000 | 12.2 | 2.18 | 23.6 | 10.8 | 11.9 | 2.07 | 18.8 | 9.1 |
| 4.0/74,000 | 10.8 | 1.92 | 32.5 | 16.9 | 10.5 | 1.93 | 31.0 | 16.0 |

It will be observed from a consideration of the date appearing in the above table, that, for example, a filter made using an apparatus substantially as described herein from fine-denier filaments exhibits a removal of the order of 46.8 as compared with a comparable filter produced without the use of coating apparatus and wherein no coating composition was applied, which had a removal of only 41.3.

Although in the above table the use of filament size up to 4 denier per filament has been set forth, wrapper may be coated using the apparatus of the present invention and used to wrap continuous filamentous material wherein the ing said coating to said strip, strip supporting means for guiding said strip as it moves in said path, and means supporting said applicator in contact adjacent said slot with said strip, at a position downstream of said strip supporting means, said strip being deflected from said path by said contact, whereby a uniform, continuous coating is applied at high speeds to said strip without tearing it, and filaments, which contact the coated strip, are bonded to it in said garniture.

2. In a filter-making apparatus comprising, a filter-forming garniture, means for feeding a strip of filter wrap paper into said garniture along a predetermined path, means for feeding filaments into said garniture to be enwrapped therein by said strip, and means for applying a coating to said strip before it is fed into said garniture, the improvement wherein said filter wrap paper is further characterized by having a thickness of less than 0.06 millimeters; and said means for applying a coating to said strip comprises an applicator having a slot for applying said coating to said strip, strip supporting means for guiding said strip as it moves in said path, and means supporting said applicator in contact adjacent said slot with said strip at a position downstream of said strip supporting means, said strip being deflected from said path by said contact, whereby a uniform, continuous coating is applied at high speeds to said strip without tearing it.

3. The invention of claim 2 further characterized in that said strip supporting means includes a roll on which the strip is guided as it moves in said path; said slot is positioned transversely of said strip; and said applicator contact tends to wrap said strip further around said roll.

4. In a filter-making apparatus comprising, a filter-forming garniture, means for feeding a strip of wrapping material into said garniture along a predetermined path, means for feeding filaments into said garniture to be enwrapped therein by said strip, and means for applying a coating to said strip before it is fed into said garniture, the improvement wherein said applying means comprises: an applicator having a slot for applying said coating to said strip, strip supporting means for guiding said strip as it moves in said path, and means supporting said applicator in contact adjacent said slot with said strip, at a position downstream of said strip supporting means, said strip being deflected from said path by said contact, whereby a uniform, continuous coating is applied to said strip.

5. In a filter-making apparatus comprising, a filter-forming garniture, means for feeding a strip of wrapping material into said garniture along a predetermined path, means for feeding filaments into said garniture to be enwrapped therein by said strip, and means for applying a coating to said strip before it is fed into said garniture, the improvement wherein said applying means comprises: an applicator having a slot for applying said coating to said strip, said slot being positioned transversely of said strip; and means supporting said applicator in contact adjacent said slot with said strip, and supporting means including a roll on which said strip is guided as it moves in said path, said contact being at a position in said path downstream of said roll so that said contact deflects said strip and tends to wrap said strip further around the roll, whereby a uniform, continuous coating is applied to said strip.

References Cited by the Examiner
UNITED STATES PATENTS

| 278,958 | 6/1883 | Henay et al. | 156—244 X |
| 2,219,491 | 10/1940 | Podmore | 131—10 |
| 2,685,344 | 8/1954 | Bunzl | 156—441 |
| 2,794,480 | 6/1957 | Crawford et al. | 156—441 |
| 2,796,846 | 6/1957 | Trist | 118—410 |
| 2,878,779 | 3/1959 | Biedermann et al. | 118—412 |
| 3,016,945 | 1/1962 | Wexler | 156—180 |

EARL M. BERGERT, *Primary Examiner.*

R. J. CARLSON, R. H. CRISS, *Assistant Examiners.*